Fig.1.

H. J. SULZEN.
COMBINATION SPEEDOGRAPH, SPEEDOMETER, AND CYCLOMETER.
APPLICATION FILED OCT. 8, 1908.

946,170.

Patented Jan. 11, 1910.
5 SHEETS—SHEET 3.

H. J. SULZEN.
COMBINATION SPEEDOGRAPH, SPEEDOMETER, AND CYCLOMETER.
APPLICATION FILED OCT. 8, 1908.

946,170.

Patented Jan. 11, 1910.
5 SHEETS—SHEET 5.

Witnesses:
A. A. Olson
W. E. Smith

Inventor:
Herman J. Sulzen
by
Joshua R. H. Potts
Atty.

UNITED STATES PATENT OFFICE.

HERMAN J. SULZEN, OF CHICAGO, ILLINOIS.

COMBINATION SPEEDOGRAPH, SPEEDOMETER, AND CYCLOMETER.

946,170.  Specification of Letters Patent.  Patented Jan. 11, 1910.

Application filed October 8, 1908. Serial No. 456,791.

*To all whom it may concern:*

Be it known that I, HERMAN J. SULZEN, a citizen of the United States, residing at Chicago, county of Cook, and State of Illinois, have invented certain new and useful Improvements in Combination Speedographs, Speedometers, and Cyclometers, of which the following is a specification.

My invention relates to devices known as speedographs or speed-recorders designed for the purpose of recording the speed of a moving automobile, carriage or other vehicle.

The object of my invention is to provide a mechanism of the character mentioned, which when correctly attached to a vehicle will be adapted to record the speed of the vehicle continuously upon a paper tape, and also one which will record the time and position of the vehicle continuously, indicating whether the latter be inside or outside of the city limits, hence to provide a mechanism adapted to keep an accurate and exact speed record of an automobile or other vehicle, for say, an entire year upon the same roll of tape.

A further object of my invention is to provide a mechanism of the character mentioned, which besides being a speedograph, will also act in the capacity of a speedometer, cyclometer, and a time-piece.

A still further object of my invention is to provide a mechanism as stated, which will be of a durable and lasting construction, and one which will be of the highest possible efficiency.

Other objects will appear hereinafter.

With these objects in view, my invention consists in a mechanism characterized as above mentioned, and in certain details of construction and arrangement of parts all as will be hereinafter fully described and particularly pointed out in the claims.

My invention will be more readily understood by reference to the accompanying drawings forming a part of this specification, and in which.

Referring now to the drawings, 1 indicates a suitable metal casing in which is compactly mounted or assembled my mechanism. Vertically extending, and substantially centrally positioned and rotatably mounted in bearings 2 and 3 in said casing 1, is a shaft 4. The downwardly, that is, exteriorly projecting end portion 5 of said shaft 4 may be operatively connected in any ordinary or preferred manner, possibly by a flexible shaft, to one of the wheels of the vehicle upon which the device is to be used. Said shaft is provided with a worm 6 at substantially the central portion thereof. In mesh with the worm 6 of said shaft 4 is a worm-wheel 7, the latter being fixed upon a horizontally disposed shaft 8, the extremities of the latter being mounted in bearings provided in the front and rear walls of the casing 1. 9 indicates a pin projecting from and formed integrally with said worm-wheel 7.

10 is a spring-cam lever, the end portion 11 of the same being suitably secured to the side wall 12 of the casing 1, the opposite end portion 13 or cam-formed portion proper of said lever 10 being in the direct path of said pin 9.

14 indicates a connecting rod, the lower extremity of which is pivotally secured to the lever 10, the upper extremity thereof being pivotally connected to the actuating arm 15 of a cyclometer. Said cyclometer is of any suitable ordinary or preferred construction, the same being contained within a casing 16 which is suitably mounted in the upper left-hand portion of the casing 1 projecting outwardly therefrom. By this arrangement with every rotation of the worm-wheel 7, it is evident that the cam-lever 10 will be raised, thereby through the medium of the connecting rod 14 and the arm 15 the actuation of the cyclometer will obviously be facilitated, and which because of the worm-wheel 7 being so proportioned as to pass through one revolution every one-tenth of a mile of travel of the vehicle, will indicate the distance traveled to tenths of a mile.

The upper end portion 17 of the shaft 4 is preferably decreased in diameter as shown. Slidably mounted upon said shaft portion 17, but fixed against rotation thereon, is a circumferentially channeled, cylindrical member 18, the same being normally held in a position at the upper extremity of said shaft portion by the resiliency of coil-springs 19, the same being suitably secured at their lower extremities to said member 18 and at their upper extremities to arms 20 fixed to and projecting from the upper extremity of the shaft 4.

21 indicate horizontally disposed guide rods, the inner extremities of the same being fixed in the shaft 4 preferably just below the portion 17 thereof so as to oppositely project therefrom. Slidably mounted upon said rods are weights 22. Cords 23 having their opposite extremities connected respectively to the under surface of the member 18 and to the weight members 22, and passing under rollers 24 provided and rotatably mounted upon the shaft 4 for this purpose, serve as a means of operatively connecting said weights and said member 18. Loosely resting in the channel of said member 18, that is, so that the latter may rotate therein, is a connecting member 25, to the portion 26 of which is suitably fixed the lower extremity of a vertically disposed rod 27. In swiveled connection with the horizontally disposed upper extremity 28 of said rod 27, are the lower extremities of a pair of connecting rods 29.

Figure 1:
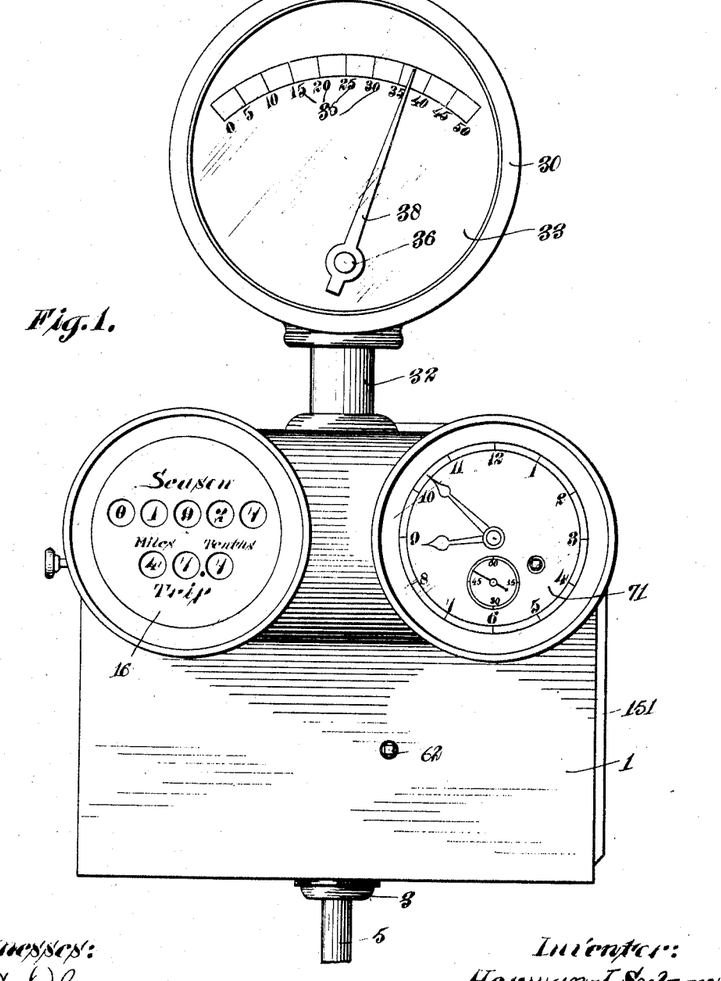
Figure 1 is a front elevation of my device in its preferred form.
Figures 2, 6:
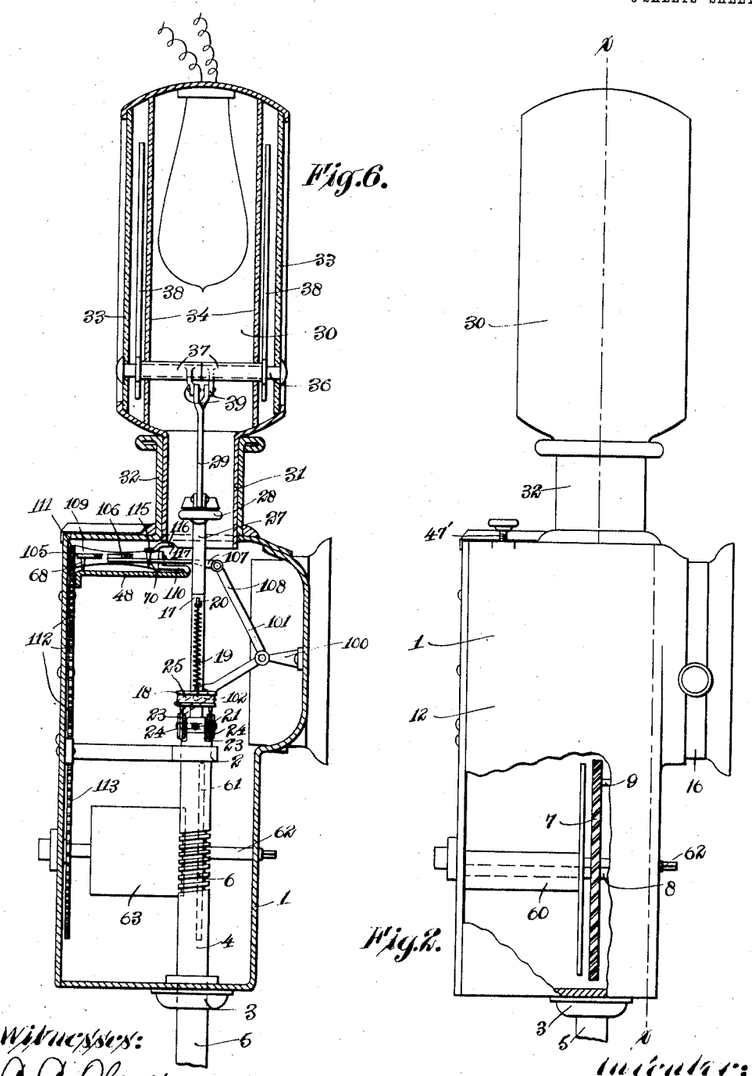
Fig. 2 is a side elevation thereof, a portion of the casing of the same being broken away so as to expose an underlying part of the mechanism.
Fig. 6 is a vertical transverse section taken substantially on the line *y—y* of Fig. 4.

30 indicates a preferably circular metal casing, which is provided with any suitable illuminating means, preferably an electric light 30'. The depending tubular portion 31 of said casing 30 is revolubly mounted in an upwardly extending tubular portion 32 of the casing 1. Either side of said casing 30 is provided with an outer cover or shield glass 33 and an inner glass 34 upon which is arranged a speed-indicating scale 35. Suitably positioned and having its extremities suitably mounted in the shield glass 33, as clearly shown in Fig. 6, is a horizontally disposed shaft 36. Rotatably mounted upon said shaft are sleeves 37 to the outer extremities of each of which is fixed an indicator or hand 38. Formed integrally with said sleeves and oppositely projecting in a substantially horizontal plane therefrom, are arms 39 to the outer extremities of which are pivotally connected the upper extremities of the before-mentioned rods 29.

With an arrangement as just described, it is evident that as the shaft 4 is revolved the weight members 22 because of their centrifugal force will have a tendency to travel in a larger radius, hence, will draw the member 18 downwardly against the tension of the springs 19. In so doing, the rod 27 is lowered, which in turn through the medium of the connecting rods 29 actuates the indicators or hands 38 of the speedometer. The weight members 22, by such an arrangement, obviously act as a governor for the speedometer, it being evident that the centrifugal force of said weights which is in a direct ratio to the speed of the vehicle, governs the radius of the circular path of said revolving weight members, and consequently the position of the member 18, the rods 29, and finally that of the indicators or hands 38.

40 indicates a preferably rectangular chamber, preferably formed of sheet metal, the same being located, as shown, in the rear upper left-hand portion of the casing 1. Said chamber is of such dimensions as to be adapted to receive a pad of tape 41.

42 and 43 indicate rollers, the same being provided with a coating of a suitable frictional material, preferably rubber, for reasons which will be obvious as the description proceeds. The shaft 44 to which the roller 43 is fixed, is mounted at one extremity in the rear wall of the casing 1, the opposite extremity thereof being mounted in the wall 45 of the tape-pad chamber 40. The shaft 46 of the roller 42 is mounted in a swinging fork 47 depending from the top wall of the casing 1. A screw 47' threaded in and projecting through the top wall of the casing 1, the lower extremity of the same engaging the extremity of an arm 47" formed integrally with one of the arms of the fork member 47, obviously facilitates keeping said rollers 42 and 43 in close contact with each other. The tape leading from the chamber 40 passes over the roller 42, thence between the latter and the roller 43, thence under the roller 43. From the latter roller it passes over a horizontally disposed, preferably metal table 48, suitably fixed as by screws or rivets 49 to the rear wall of the casing 1, thence over an angular guide plate 50 also secured preferably by screws or rivets 51 to the rear wall of the casing 1. Whence it passes downwardly close to the right-hand wall of the casing 1 to and under a roller 52, which is fixed to a shaft 53 the extremities of which are rotatably mounted in the front and rear walls of the casing 1. After passing under said roller 52, said tape passes between the roller 52 and a similar rubber covered roller 54 and over the latter. The extremities of the shaft 55 of said roller 52 are mounted in a fork 56, the latter being swingingly mounted upon the bottom wall 57 of the casing 1. A leaf-spring 58 provided on the casing bottom 57 so that the free extremity thereof engages the outer extremity of an arm 59 formed integrally with and projecting from one of the arms of the fork 56, serves as a means to keep said rollers 52 and 54 in close contact with each other. Whence the tape passes to a reel 60 upon which it is coiled. Said reel 60 is mounted upon the shaft 8, it being adapted to be driven thereby by yielding frictional contact therewith, for obvious reasons. A gear-wheel 61 fixed to a shaft 62, the latter having bearings in the front and rear walls of the casing 1 and being spring driven, 63 indicating the driving spring casing, said gear-wheel 61 meshing with a reducing pinion 64 which is formed integrally with a gear-wheel 65 the latter being mounted upon a shaft 66, and in mesh with a pinion 67 fixed to the shaft 53 serves as a means of driving said rollers 52 and 54, hence, forms the means of drawing the tape through the mechanism in the manner as before described. While passing over the table 48 the said tape is operated upon by a perforating needle 68 which is adapted to provide said tape with a series of perforations, the same being adapted to graphically indicate the speed of a vehicle. Said tape is also operated upon by two additional pencils 69 and 70, the same being adapted to contact and graphically indicate, respectively, upon said tape, the time of day and the location or place, whether inside or outside of the city limits, of the vehicle. The principal function of the remainder of the mechanism is to operate said needle 68 and pencils 69 and 70.

Suitably mounted in the upper right-hand corner of the casing 1 and projecting slightly forwardly therefrom is a casing 71, in which is contained an ordinary clockwork. The central arbor 72 of said clockwork projects rearwardly from the casing 71, as clearly shown in Fig. 7. Fixed to said arbor 72 close to the casing 71 is a circular disk 73, the same being provided with a tapering notch 74 in the periphery thereof for a purpose hereinafter described. 75 is a pinion mounted upon said arbor 72, the same being formed integrally with the disk 73. In mesh with said pinion 75 is a gear-wheel 76, the latter being fixed upon a horizontally disposed shaft 77, rotatably mounted in bearings in the clockwork casing 71.

78 is a pinion fixed to the extremity of the shaft 77. Loosely mounted upon the arbor 72 in mesh with said pinion 78 is a gear-wheel 79. Said gear-wheels and pinions are so proportioned that the gear-wheel 79 passes through one revolution to twenty-four of the disk 73 for a purpose hereinafter described. Formed integrally with or soldered to said gear-wheel 79 is an inwardly flanged disk 80. Said disk 80 is of a diameter slightly less than that of the disk 73 and is provided upon its periphery with notches 81 and 82, the same being of different depths and positioned diametrically opposite thereon for a purpose hereinafter stated. Vertically extending and slidably mounted in guides 83 upon the rear face of the casing 71 directly over the arbor 72 is a T-shaped member 84. The horizontally extending arm 85 of said member 84 is adapted to normally rest upon the periphery of the disk 73 and to extend directly above the disk 80.

Figure 3:
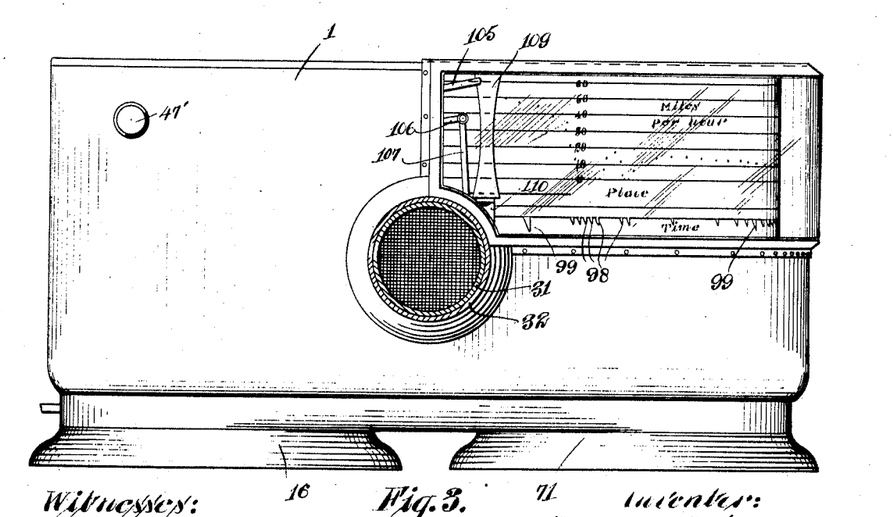
Fig. 3 is an enlarged top plan view thereof, the speedometer proper being broken away so as to expose the underlying parts.

86 indicates a horizontally disposed bell-crank lever rockingly mounted in bearings 87. The extremity of the end portion 88 of said lever 86 is adapted to rest upon the arm 85 of the member 84, as clearly shown in Fig. 7, it being forcibly held in contact therewith by means of a coil spring 89, the respective extremities of the latter being fixed to the casing 1 as at 90 and to the upper extremity of a vertically disposed arm 91 whose lower extremity is fixed to the bell-crank lever 86. Pivotally secured as at 92 to a block 93 formed upon the under surface of the top wall of the casing 1 is a spring pencil arm 94 to the outer extremity of which is secured the before-mentioned pencil 69, said spring arm being adapted to keep said pencil 69 in constant contact with the surface of the tape. A link 96 the extremities of which are respectively secured to said spring arm 94 and to the vertically extending end portion 97 of the bell-crank lever 86, serves as a means of operatively connecting said last-mentioned parts. When the device is in operation the disk 73 which as before described, is driven by the central arbor of the clockwork, hence, passes through one revolution an hour. As the notch 74 in said disk 73 is brought opposite the arm 85 of the member 84, that is, so as to be adapted to register therewith, said arm 85 will obviously drop therein, the outer extremity thereof in which event will rest upon the periphery of the disk 80. By this action the bell-crank lever 86 because of the tension of the coil-spring 89 will be partly revolved, and consequently will impart lateral movement to the pencil 69 which operates upon the tape providing the same with a marking similar to those indicated by 98 shown in Fig. 3. As before stated the disk 73 passes through one revolution each hour, hence, at the end of each hour a marking as 98 will be made upon the tape. The disk 80 which as before stated limits the downward movement of the member 84 when the latter is resting in the notch 74 travels 1/24th as fast as the disk 73 as before described, hence, passes through one revolution every twenty-four hours. By providing the periphery of said disk 80 with the notches 81 and 82 as beforementioned, as each of the said notches are brought opposite the arm 85 of the member 84 the latter will necessarily be permitted to drop farther than when resting in the notch 74 as before described, hence, allowing of greater movement of the pencil 69, consequently providing the tape with a longer marking 99 as shown in Fig. 3. By this arrangement a longer marking will be recorded every twelve hours. By making said notches 81 and 82 of different depths, it is evident that the distinguishing between, say 12 o'clock at night and 12 o'clock at day, may readily be facilitated.

Pivotally mounted in a bracket 100 secured to the front wall of the casing 1 is a bell-crank lever 101. The lower extremity 102 of said lever is forked, as shown, for the reception of a pin 103 projecting from and formed integrally with the member 25. Pivotally secured as at 104 to the block 93 is a spring needle supporting arm 105 to the outer extremity of which is secured the said needle 68, said arm being adapted to normally keep the point of said needle just above the surface of the tape for obvious reasons.

Figure 5:
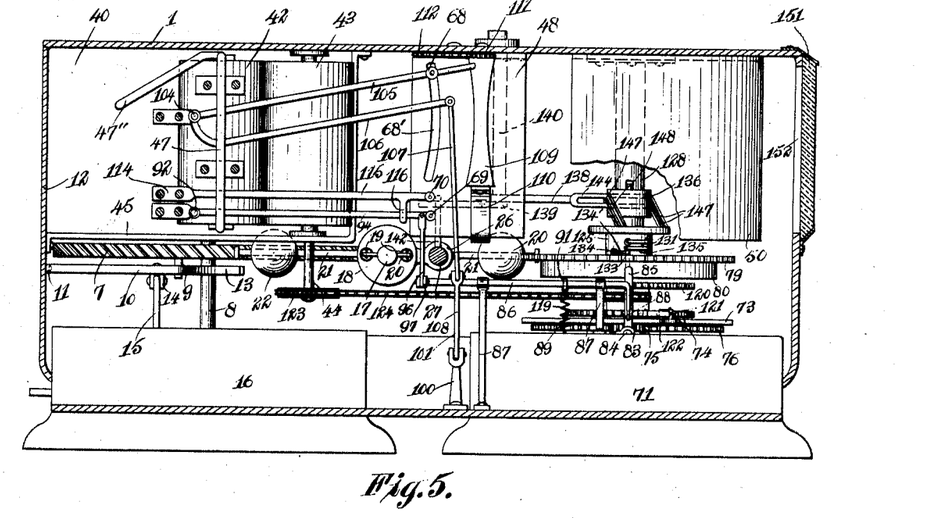
Fig. 5 is a view similar to that of Fig. 3, except that the top casing portion is removed so as to expose the mechanism lying beneath the same.

68' indicates a circular slot provided in the table 48 for the reception of a needle point when passing through, that is, when perforating the tape. Formed integrally with said arm 105 and preferably extending parallel therewith is an arm 106. A link 107 the extremities of which are respectively secured to said arm 106 and to the upper extremity 108 of the bell-crank lever 101 serve as means of operatively connecting said arm 106, hence the needle supporting arm 105 and the bell-crank lever 101. In order to facilitate vibrating said arm 105 which obviously is necessary in order that the needle be adapted to puncture or perforate the tape, I provide a concavo edged metal plate 109 rotatably mounted in bearings provided in the rear wall or the casing 1 and in a bracket 110 projecting from and formed integrally with the table 48. The concave edge portions of said plate 109 are adapted, as clearly shown in Fig. 5, to engage the extremity of the needle supporting arm 105, hence, with each revolution of said plate said arm will be vibrated twice, thereby causing two perforations to be made by the needle in the tape. In order to facilitate driving said plate 109 I provide the same with a gear-wheel 111 at one extremity thereof, which through the medium of a train of gears 112 rotatably mounted upon the rear-wall of the casing 1 will be driven from a gear-wheel 113 fixed upon the shaft 62, by the spring provided upon the latter.

Figure 4:
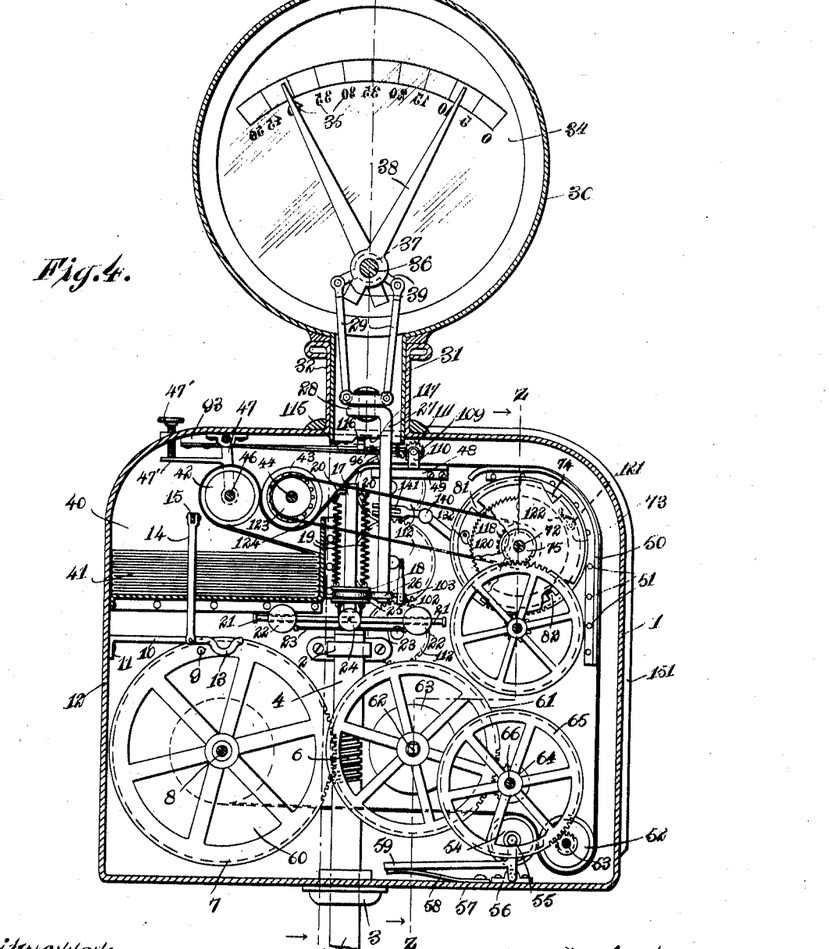
Fig. 4 is a vertical longitudinal section taken on substantially the line *x—x* of Fig. 2.

By an arrangement as just described, it is obvious that the position of the bell-crank lever 101 and therefore the needle 68 is under the government of the same means as governs the position of the indicators or hands 38 of the speedometer as before described, said needle 68 being moved in an arc with the pivotal point 104 as a center, transversely across the tape. By the provision of the needle adapted to operate and perforate the tape as stated, that is, without a constant contact therewith, all possibility of any impediment in the correct movement of said needle and said tape is eliminated. Secured as at 114 to said block 93 and preferably positioned between said arms 94 and 106 is a spring arm 115 to the extremity of which is secured the before-mentioned pencil 70. Said spring arm 115 is adapted to normally keep said pencil 70 from contacting the tape, in which case a projection 116 formed integrally with said arm and which is adapted to rest against the lower edge of the depending tubular portion 31 of the casing 30 rests in a recess 117 provided in said lower edge of said tubular portion 31, as clearly shown in Figs. 4 and 6. By simply rotating the casing 30, said projection 116 will obviously be forced out of said recess 117 whereupon it will be lowered hence, forcing said pencil down into contact with the paper. My idea is to have the inner glasses 34 of the casing 30 stained different colors, that is, say for instance have one white and the other red. When inside the city limits the white light, that is, the white glass is to be faced forwardly, in which position the projection 116 will be resting in the recess 117, hence, the pencil will not operate upon the tape. When outside the city limits, the red light is to be shown, in which case said projection will not be resting in said recess, hence said pencil will contact the tape, indicating that the vehicle is outside of the city limits.

Figure 7:
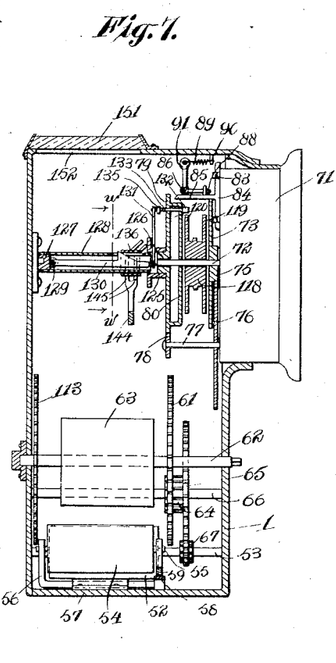
Fig. 7 is a vertical transverse section taken on substantially the line *z—z* of Fig. 4.

In order to facilitate a regular and steady feed of the tape through the mechanism, I provide the arbor 72 with a doubled flanged sprocket-wheel 118 loosely mounted thereon and preferably positioned between the disks 73 and 80, as clearly shown in Fig. 7, the flanges 119 and 120 thereof being each provided with ratchet teeth upon the peripheries thereof.

121 indicates a pawl mounted upon the disk 73, the same being adapted to be held in engagement with the ratchet teeth in the flange 119 by means of a leaf-spring 122.

By providing the shaft 44 of the roller 43 with a sprocket-wheel 123, and by connecting the latter with the sprocket-wheel 118, by a chain 124, it is obvious that the escapement of the tape will be governed by the velocity of the arbor 72 of the clockwork, hence, will be regular and steady.

By employing a device as thus far described, just as much tape will be used when the vehicle is at rest as when the same is in motion thereby resulting in a waste of tape and necessitating the storing in the device of a comparatively large amount of tape, hence, resulting in a device too spacious to be conveniently used and thereby decreasing the practical value of the device. With the obviation of this objection in view, I provide the gear-wheel 79 with an outwardly flanged collar or sleeve 125 fixed thereto in any suitable manner, but preferably by being grazed or sweated upon a cylindrical projection 126 formed upon said gear-wheel. Having one of its extremities fixed in said member 125 and the other extremity thereof journaled upon a cylindrical projection 127 formed upon the inner surface of the rear wall of the casing 1, as clearly shown in Fig. 7, is a tubular member 128, the same being in axial alinement with the arbor 72. Longitudinally extending within said tubular member 128, the same being pivotally secured therein as at 129 is a lever 130. Pivotally secured to the other extremity of said lever 130 is a radially extending rod 131, the same passing through a slot or perforation provided in the sleeve member 125.

132 indicates a pawl fixed to a shaft 133 the latter being rockingly mounted in the gear-wheel 79 and the disk 80, as shown in Fig. 7. Said pawl is adapted to engage the teeth in the flange 120 in the sprocket-wheel 118 and is normally held in engagement therewith by a coil-spring 134 which is fixed at one extremity to the gear-wheel 79, the other extremity thereof engaging an arm 134' fixed to and projecting from the shaft 133.

135 indicates a link one extremity of the same being fixed to the shaft 133, the other extremity thereof being pivotally secured to the upper extremity of the rod 131. By this provision it is obvious that by depressing the lever 130 causes the disengagement of said pawl 132. When said pawl 132 is in engagement with said ratchet teeth, it is evident that the escapement of the tape is governed by the velocity of the gear-wheel 79, hence, is just 1/24th as great as when said pawl is not in engagement with said ratchet teeth, as in the latter case it is obviously governed by the velocity of the disk 73, it being my object to decrease the tape escapement at just this ratio as when the vehicle is at rest. In order therefore to facilitate depressing said lever 130 when the vehicle is at rest, I provide the tubular member 128 with a slidable sleeve 136, and form said lever 130 with an obliquely edged projection 137 the latter extending through a longitudinal slot provided in the member 128 for the reception of the same.

Figure 8:
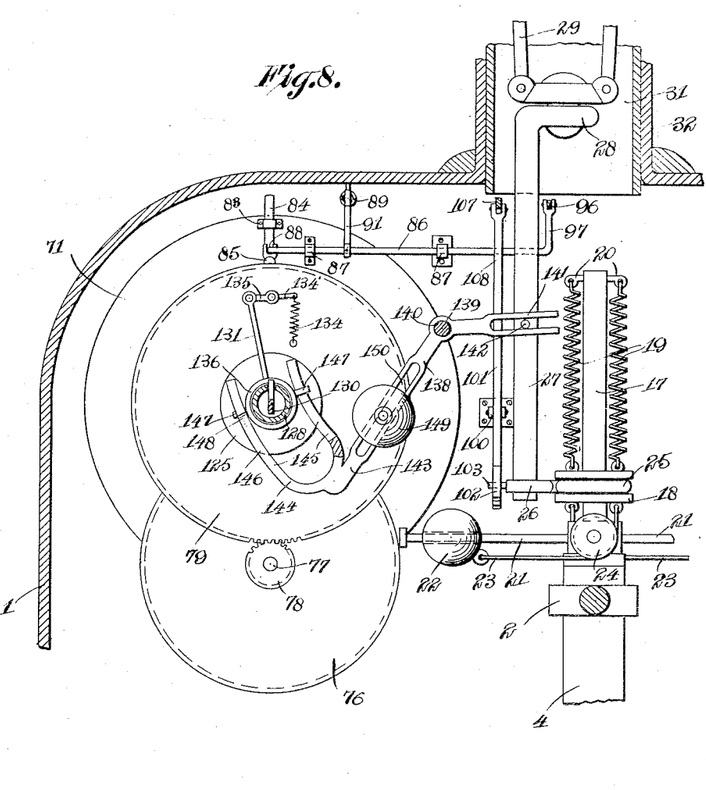
Fig. 8 is an enlarged sectional detail taken on substantially the line *w—w* of Fig. 7.

138 is a bell-crank lever pivotally mounted as at 139 to a support 140. The end portion 141 of said lever is forked, as clearly shown in Fig. 8, for the reception of a pin 142 projecting from and formed integrally with the rod 27. The opposite end portion 143 of said lever is provided with an integral arched double fork 144, the main arms 145 being adapted to receive the sleeve 136, as shown in Fig. 8, the auxiliary fork arms 146 being adapted to receive pins 147 formed upon and projecting outwardly from opposite points upon the sleeve 136. The end portions of said arms 146 are offset or obliquely disposed as at 148, the extremities thereof being adapted to be in constant contact with the outer surface of the flanged portion of the member 125, as clearly shown in Fig. 5. By this arrangement as the vehicle moves more slowly and finally is brought to a stop thereby causing the rod 27 to be raised, the end portion 141 of the bell-crank lever 138 will also be raised, hence, causing the forked end portion 143 thereof to be lowered, in which event, the sleeve 136 will be moved down the member 128, thereby releasing the lever 138, which when the vehicle was in motion was obviously depressed, as shown in the drawings, by the sleeve 136 which in the latter case was in engagement with the projection 137, and which in turn allows the pawl 132 to engage the ratchet teeth in the flange 120 in the sprocket 118 with a result as before described. Thus the escapement of the tape is automatically governed according to the need for it.

A weight 149 adjustably secured in a longitudinally extending slot 150 provided in the end portion 143 of the lever 138 obviously acts in the capacity of a speed-equalizer for the governor weights 22 when it is taken into consideration that the centrifugal force of a revolving body, in this case the weights 22, increases directly as the radius in which it moves and also as the square of the number of speed revolutions.

151 indicates a cover glass the same covering an opening or slot 152 in the top and side of the casing 1 by means of which the marked tape will be clearly visible from without, and also making it possible to readily observe the speed record of the vehicle for two or three days previous.

While I have shown what I deem to be the preferably form of my device, I do not wish to be limited thereto as it is obvious there might be many changes made in the details of construction and arrangement of parts without departing from the spirit of my invention.

Having described my invention what I claim as new, and desire to secure by Letters Patent, is:

1. In a device of the class described, a casing and cyclometer-containing and clockwork-containing casings arranged therein in combination with a table arranged within the first said casing, means for feeding a record sheet over said table, recording points arranged above said table and means for actuating said points to automatically record the speed of a vehicle, and the time and manually controlled means for causing the device to record the location, substantially as described.

2. A device of the class described, consisting of a casing, cyclometer-containing and clockwork-containing casings secured in said first-mentioned casing, a horizontally disposed table secured therein, a chamber adapted to receive a pad of tape, means for drawing said tape over said table, and means for coiling the same upon a reel, a needle and pencils supported in said casing and above said table, the same being adapted to contact said tape as the same is drawn over said table, means for actuating said needle and said pencils so that the same will be adapted to respectively record the speed of a vehicle, the place or location thereof, and the time of day, a vertically disposed shaft revolubly mounted in said casing, means driven from said shaft adapted to actuate the operating lever of said cyclometer, a speedometer casing mounted upon said first-mentioned casing, and means slidably mounted upon said shaft adapted to actuate the speed indicators or hands in said speedometer casing, substantially as described.

3. In a device of the class described, the combination in a suitable casing of a vertically disposed shaft revolubly mounted therein, radially extending arms fixed in said shaft, weight members slidably mounted upon said arms, a circular member vertically slidable upon said shaft, spring means adapted to normally yieldingly hold said circular member in its uppermost position upon said shaft, means connecting said circular member and said weight members whereby by moving said weight members outwardly will cause said circular member to be lowered upon said shaft, a bell-crank lever pivotally mounted in said first-mentioned casing, the lower extremity thereof being operatively connected with said circular member, a needle-holding arm operatively connected with the upper extremity of said lever whereby by actuating said lever will impart transverse motion to said needle-holding arm, and means for vibrating said arm, substantially as described.

4. In a device of the class described, the combination in a suitable casing of a clockwork-containing casing secured therein, a notched disk fixed to the central arbor of said clockwork, a notched disk loosely mounted upon said central arbor in geared connection with said first-mentioned disk such that the latter moves twenty-four times as fast as the former, a vertically slidable arm adapted to engage the notches in said disk, a bell-crank lever mounted in said first-mentioned casing in operative connection with said arm, a pencil supporting arm pivotally secured in said first-mentioned casing in operative connection with said bell-crank lever whereby by the forcing of said arm into the notches in said disk will impart greater or less transverse motion to said pencil supporting arm, substantially as described.

5. In a device of the class described, the combination of a suitable casing with a horizontally disposed table supported therein, tape feeding mechanism for drawing a tape over said table, a pencil, a pencil supporting arm pivotally mounted for lateral oscillation in said casing above said table and normally holding said pencil from contacting said table, and a rotatable member constantly driven by said tape feeding mechanism and in constant engagement with said arm whereby a partial revolution of the same will force said pencil into contact with the tape, said rotatable member comprising a plate having both of its edges concavely curved to conform to the arc of oscillation of said arm, substantially as described.

6. In a device of the class described, a casing in combination with a table arranged therein, mechanism for feeding a record sheet across said table, a needle supporting arm, a recording point thereon arranged above said table, a plate rotatably supported above said table and adapted when rotated to engage said arm, and means actuated by said mechanism for constantly rotating said plate, substantially as described.

7. In a device of the class described, the combination in a suitable casing of a clockwork-containing casing secured therein, a horizontally disposed table, a tape-containing chamber, a roller provided with a coating of frictional material rotatably mounted in a swinging fork, a roller provided with a coating of frictional material fixed to a shaft mounted in bearings in said first-mentioned casing, means for keeping said rollers in forced contact with each other, the tape from said chamber passing between said rollers, thence over said table, means for drawing said tape from said chamber and between said rollers and over said table, a double flanged sprocket-wheel loosely mounted upon the central arbor of said clockwork, a sprocket-wheel fixed to the shaft of the second-mentioned roller, a chain connecting said sprocket-wheels, and means adapted to engage the periphery of the flanges of said double flanged sprocket-wheel whereby the latter when the vehicle to which the device is attached is in motion will be driven from the central arbor of said clockwork and when said vehicle is at rest will be driven through a train of reducing gearing less fast, substantially as and for the purpose specified.

8. In a device of the class described, the combination in a suitable casing of a clockwork-containing casing, a horizontally disposed table, a tape-containing chamber, a swingingly mounted roller provided with a coating of frictional material, a second roller provided with a coating of frictional material fixed to a rotatably mounted shaft, means for keeping said first mentioned roller in constant contact with the second-mentioned roller, the tape from said chamber passing between said rollers, thence over said table, means for drawing said tape over said table, a double flanged sprocket-wheel loosely mounted upon the central arbor of said clockwork, the peripheries of the flanges of said sprocket-wheel being provided with ratchet teeth, a sprocket-wheel fixed to the shaft of the second-mentioned roller, a chain connecting said sprocket-wheels, a disk fixed to the central arbor of said clockwork, a second disk loosely mounted upon said central arbor in geared connection with said first-mentioned disk so that when the device is in operation the second-mentioned disk will move more slowly than the first-mentioned, a pawl pivotally mounted upon said first-mentioned disk in yielding engagement with the ratchet teeth in one of the flanges of said flanged sprocket-wheel, said pawl being adapted to retard the movement of said flanged sprocket-wheel so that the latter may be moved only as fast as the central arbor of the clockwork, a second pawl pivotally mounted upon the second-mentioned disk the same being adapted to engage the ratchet teeth in the other flange of said flanged sprocket-wheel, means for holding said pawl out of engagement with said teeth when the vehicle to which the device is attached is in motion, and means for forcing said pawl into engagement with said teeth when the vehicle is at rest, substantially as and for the purpose specified.

9. In a device of the class described, a casing and a table arranged therein in combination with an indicator casing, an indicator therein, a vertical tubular stem on said indicator casing whereby it is revolubly mounted in the first said casing, indicator operating mechanism, an arm mounted above said table, a recording point on said arm, means for feeding a record sheet across said table and means on said tubular stem for holding said point in engagement with the record sheet when the indicator and stem are in one position and for releasing said point from engagement with the sheet when in another position, substantially as described.

10. In a device of the class described, a casing and a table arranged therein and means for feeding a record sheet across said table, in combination with an indicator casing revolubly mounted on the first said casing, an indicator upon each side of said indicator casing, said indicators being provided with distinguishing colored dials, and means for recording on said sheet which of said dials is turned outwardly and exposed to view, substantially as described.

11. In a device of the class described, a casing, a table arranged therein and means for feeding a record sheet across said table, in combination with an indicator casing having oppositely facing dials and indicator points, a vertical tubular stem on said indicator casing whereby it is revolubly mounted on the first said casing, an indicator operating mechanism, an arm mounted above said table, a recording point on said arm, and a cam on the lower end of said tubular member for holding said point in engagement with said sheet when one of said dials is turned outwardly and for releasing said point from engagement with the sheet when the other dial is turned outwardly, said dials being in distinguishing colors, substantially as described.

12. In a device of the class described, a casing a table supported therein and means for feeding a record sheet across said table, in combination with a clock work driven arbor, a pair of disks mounted on said arbor, one of said disks being adapted to make a complete revolution every hour and the other disk one revolution in twenty-four hours, the first disk being provided with a notch in its periphery and the second disk being provided with a peripheral notch, said second disk being of less diameter than the first disk, a member resting on the periphery of the first said disk and adapted to drop into the notch thereon with each revolution, and the notch on the second disk permitting a greater drop of said member, a pencil point and means actuated by the drop of said member for actuating said point to make a mark on the record sheet proportional in length to the drop of said member, substantially as described.

13. In a device of the class described a table, and means for feeding a record sheet across said table, in combination with a clock work driven arbor, a disk mounted on said arbor and adapted to make one revolution each hour, a second disk mounted on said arbor and adapted to make a revolution in twenty four hours, a sprocket wheel loosely mounted on said arbor between said disks, lateral flanges on said sprocket wheel provided with ratchet edges, a pawl on each of said disks adapted to engage the respective flanges on said wheel, means connecting said wheel and the means for feeding the record sheet whereby the speed of the latter is governed by the rotation of the former, and means for disengaging the pawl on the twenty-four hour disk from its respective ratchet when the vehicle comes to rest, substantially as described.

In testimony whereof I have signed my name to this specification in the presence of two subscribing witnesses.

HERMAN J. SULZEN.

Witnesses:
 JANET E. HOGAN,
 HELEN F. LILLIS.